(12) United States Patent
Thoms et al.

(10) Patent No.: US 6,190,595 B1
(45) Date of Patent: Feb. 20, 2001

(54) EXTRUSION ARRANGEMENT

(75) Inventors: Volker Thoms, Calw; Andreas Poellmann, Herrenberg; Klaus Mueller, Berlin, all of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/062,616

(22) Filed: Apr. 20, 1998

(30) Foreign Application Priority Data

Apr. 18, 1997 (DE) .................................... 197 16 292

(51) Int. Cl.$^7$ ............................ B29C 47/22; B29C 47/24
(52) U.S. Cl. .................... 264/177.16; 264/209.2; 425/319; 425/381; 425/465; 425/466
(58) Field of Search .................... 425/190, 319, 425/325, 381, 392, 465, 466; 264/285, 209.21, 177.16

(56) References Cited

U.S. PATENT DOCUMENTS

| | | | |
|---|---|---|---|
| 2,422,953 | * | 6/1947 | Davies et al. . |
| 3,490,113 | * | 1/1970 | Bulck et al. . |
| 4,273,523 | * | 6/1981 | Levens . |
| 5,424,023 | * | 6/1995 | Riley et al. . |
| 5,520,870 | * | 5/1996 | Allan et al. . |

FOREIGN PATENT DOCUMENTS

| | | |
|---|---|---|
| 973138 | 12/1959 | (DE) . |
| 1107926 | 5/1961 | (DE) . |
| 28365 | 4/1964 | (DE) . |
| 3737453 | 5/1988 | (DE) . |
| 4131332A1 | 3/1993 | (DE) . |
| 0706843A1 | 4/1996 | (EP) . |
| 917069 | 1/1963 | (GB) . |
| 2-137612 | 5/1990 | (JP) . |

* cited by examiner

Primary Examiner—Harold Pyon
Assistant Examiner—Joseph Leyson
(74) Attorney, Agent, or Firm—Evenson, McKeown, Edwards & Lenahan, P.L.L.C.

(57) ABSTRACT

Extrusion arrangement for manufacturing bent workpieces, having an extrusion die which is guided in an extrusion chamber and compresses material situated in the extrusion chamber and presses it through a bottom die arranged on a head-side end of the extrusion chamber. At least two further bottom die elements are arranged behind the bottom die in a parallel adjoining manner and are displaceably and rotatably disposed such that their successive passage openings form an extrusion duct of a variable curvature and twisting. For producing hollow profiles, an arbor is provided in the interior of the extrusion chamber, whose extension extending through the outlet opening of the bottom die and into the passage openings of the bottom die elements consists of a plurality of segments which are movably connected with one another.

30 Claims, 1 Drawing Sheet

EXTRUSION ARRANGEMENT

BACKGROUND AND SUMMARY OF THE INVENTION

This application claims the priority of German application 197 16 292.4-14, filed in Germany on Apr. 18, 1997, the disclosure of which is expressly incorporated by reference herein.

The invention relates to an extrusion arrangement for manufacturing bent workpieces, having an extrusion die which is guided in an extrusion chamber, which compresses material situated in the extrusion chamber and which presses it through a bottom die arranged at a head-side end of the extrusion chamber, at least two bottom die elements being provided which are arranged behind the bottom die in a parallel adjoining manner.

An extrusion arrangement of this type is known from German Patent Document DE 41 31 332 A1. The extrusion arrangement described there comprises a tool core with an adjoining tool jacket which consists of disk-type, assembled jacket parts. The jacket parts, which are fixedly placed upon one another, together with their supplementing duct sections, form a circular-arc-shaped duct. The described division of the tool jacket into individual segments facilitates the manufacturing in that the duct in the individual segments can be premachined and, when all jacket parts are assembled, can then be processed to form the finished product. For producing an internal profile, rods are provided in the case of the known extrusion arrangement which reach into the circular-arc-shaped duct and which expediently also have a curved design.

From European Patent Document EP 0 706 843 A1, an arrangement is known which is used for the manufacturing of curved solid and hollow profiles with complex cross-sections by means of a combination of extruding and bending, the workpiece being bent simultaneously with or immediately after the forming extrusion process by means of a force acting upon the workpiece transversely to the extruding direction. For this purpose, a device generating a transverse force is arranged behind the bottom die viewed in the extruding direction, which device can be pressed against the emerging billet, a bending zone existing in the space between the extrusion surfaces and the outlet zone which is free of contact surfaces.

From German Patent Document DE-AS 11 07 926, a spraying head for extruding is known for manufacturing curved workpieces from thermoplastic material, in the case of which a ram body is arranged spaced from the nozzle outlet of the spraying head, which ram body is constructed as a slider, which is provided with a recess and is guided transversely to the nozzle duct, or as a rotatable ring with an eccentrically situated opening. By the adjustment of this slider or ring with respect to the normal position, the passage cross-section for the emerging thermoplastic mass is changed on one side, which causes a desired speed difference during the exit from the mouthpiece.

From German Patent Document DD-PS 28 365, an extrusion head for extruding presses is known for manufacturing workpieces from ceramic masses which, for reducing a texture formation, consists of several firmly assembled segments whose inside diameter has a partially conical and partially cylindrical construction.

Based on this state of the art, it is an object of the present invention to provide an extrusion arrangement of the initially mentioned type, in the case of which, immediately following the extruding operation, a stretching-bending operation is possible which is as simple and as space-saving as possible and which permits the manufacturing also of complex, spatially bent profiles.

For achieving this object, an extrusion arrangement is provided for manufacturing bent workpieces, having an extrusion die which is guided in an extrusion chamber and which compresses material situated in the extrusion chamber and presses it through a first bottom die arranged at a head-side end of the extrusion chamber, further bottom die elements being provided which are arranged in a parallel adjoining manner behind the first bottom die, wherein the further bottom die elements are displaceably and rotatably disposed such that their successive passage openings form an extrusion duct of a variable curvature and twist.

Accordingly, in preferred embodiments of the invention, further bottom die elements are provided which are arranged behind the bottom die of the extrusion arrangement and which adjoin one another in parallel and with respect to the bottom die. The further bottom die elements are displaceably and rotatably disposed such that their successive passage openings form an extrusion duct whose curvature and twisting are variably and individually adjustable. Preferably, the further bottom die elements can be adjusted continuously and can be fixed in the desired position. Advantageously, the displacement of the bottom die elements takes place in parallel to the bottom die of the extrusion arrangement; that is, perpendicularly to the exiting direction of the extruded profile from the extrusion chamber. The rotating of the further bottom die elements advantageously takes place in a plane in parallel to the plane of the bottom die of the extrusion arrangement; that is, in a plane which is situated perpendicularly to the exiting direction of the extruded profile from the extrusion chamber. According to the invention, the adjoining further bottom die elements therefore form an extrusion duct into which the extruded profile enters after its exiting from the extrusion chamber and the outlet opening of the bottom die. Because of the displaceability and the twisting capacity of the further bottom die elements, the extrusion duct can be provided with an arbitrary curvature and/or a twisting, so that the wall of the extrusion duct formed by the passage openings of the further bottom die elements exercises a transverse force onto the extruded profile.

According to certain preferred embodiments of the invention, the passage openings of the further bottom die elements have rounded edges. As a result, a passage of the extruded profile through the passage openings of the further bottom die elements is ensured without any problem.

In a further development of certain preferred embodiments of the invention, a holding device for the further bottom die elements is provided which is preferably exchangeable so that a different number of bottom die elements can be arranged behind the bottom die of the extrusion device and extrusion ducts of different lengths can therefore be produced.

In a particularly advantageous further development of certain preferred embodiments of the invention, the bottom die of the extrusion arrangement is part of this holding device. As a result, the extrusion arrangement according to the invention has a particularly simple construction and the bottom die can be exchanged without any problems as required.

In a further development of preferred embodiments of the invention, a stationary crosshead of the extrusion arrangement is arranged to be spaced from the further bottom die and from the bottom die elements, for example, by being acted upon by the holding device. For drawing the curved extruded profile off in front of the stationary crosshead, a lateral opening is advantageously provided for this purpose in the holding device.

In order to permit a manufacturing of hollow profiles, in a particularly advantageous further development of certain preferred embodiments of the invention, an arbor is provided in the interior of the extrusion chamber which is arranged essentially concentrically with respect to the exit opening of the bottom die.

So that the hollow cross-section is also maintained in the extrusion duct for bending the billet, the arbor advantageously has an extension which reaches through the exit opening of the bottom die and into the passage openings of the further bottom die elements.

It was found to be particularly advantageous for the extension to consist of a plurality of segments which are movably connected with one another and which are able without any problem to adapt to a curvature defined by the displaceable and rotatable bottom die elements.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a lateral longitudinally sectional view of an extrusion arrangement according to a preferred embodiment of the invention.

DETAILED DESCRIPTION OF THE DRAWINGS

Figure 1:
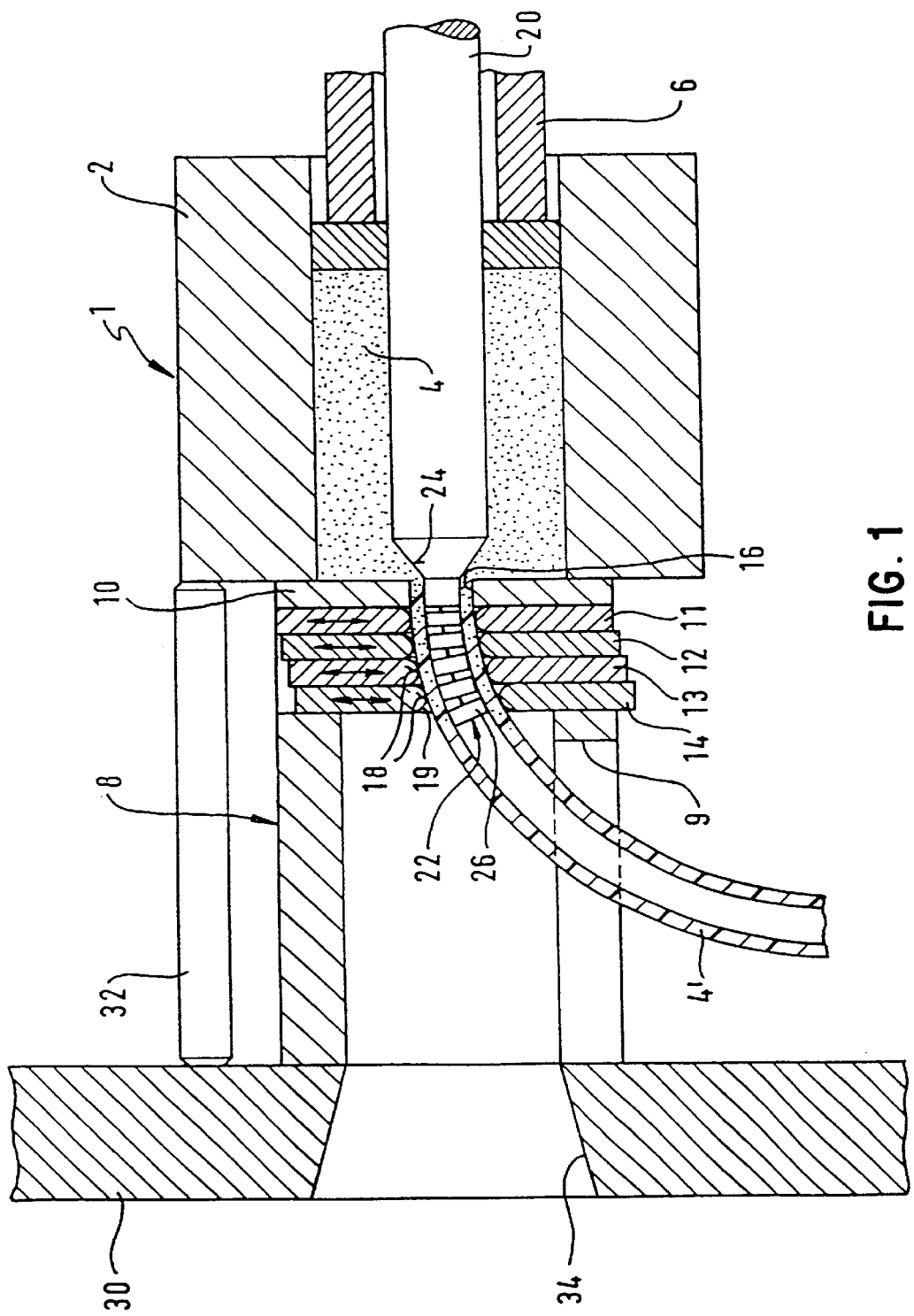

The single drawing FIGURE is a sectional view of an extrusion arrangement 1 according to the invention for manufacturing bent workpieces, having an extrusion chamber 2 comprising a hollow space for receiving material 4 and having an extrusion die 6 which is guided in the extrusion chamber 2 and which compresses the material 4 by means of a longitudinal movement (in the representation of the FIGURE, to the left).

At the head-side end of the extrusion chamber 2 situated in the extruding direction of the extrusion die 6, a bottom die 10 is arranged which closes off the hollow space of the extrusion chamber 2 and has an outlet opening 16. For manufacturing an extruded profile, the material 4 situated in the extrusion chamber 2 is compressed by the extrusion die 6 and is pressed through the outlet opening 16 of the bottom die 10.

Further bottom die elements 11, 12, 13, 14 are arranged behind the bottom die 10 in an adjoining manner in the extruding direction, which are disposed in parallel in a mutually adjoining manner in a holding device 8. The holding device 8 is constructed such that the bottom die 10 forms a part of the holding device 8.

The further bottom die elements 11, 12, 13, 14 can be displaced in the holding device 8 in parallel to the bottom die 10; that is, perpendicularly to the extruding direction in the sense of the indicated double arrows. In the illustrated embodiment, only a downward displacement of the further bottom die elements 11, 12, 13, 14 is possible, but within the scope of the invention, a displacement toward the side and in the upward direction may also be provided according to other preferred embodiments.

Furthermore, the further bottom die elements 11, 12, 13, 14, are rotatably disposed in the holding device 8, specifically in parallel to the bottom die 10, thus in a plane perpendicular to the outlet opening of the extruded profile.

As illustrated in the embodiment of the FIGURE, according to the invention, by means of the bottom die elements 11, 12, 13, 14 and their successive passage openings 18, an extrusion duct with an adjustable curvature and twisting (for example, in the case of a rectangular cross-section of the extruded profile) can be formed. In order to ensure a particularly good passage through the passage openings 18 of the further bottom die elements 11, 12, 13, 14, the edges 19 of the passage openings 18 are rounded. Because of the curvature generated by the offsetting of the further bottom die elements 11, 12, 13, 14 with respect to one another, the planes of the passage openings 18 are each situated at an angle to the course of the extruded profile, which is taken into account by the rounding of the edges 19.

The embodiment of the extrusion arrangement according to the invention illustrated in the drawing FIGURE permits a manufacturing of hollow profiles. For this purpose, an arbor 20 is provided in the interior of the extrusion chamber 2 which is arranged essentially concentrically to the outlet opening 16 of the bottom die 10. At its end situated in the extruding direction, the arbor 20 has a conical tapering 24 which extends into the outlet opening 16 of the bottom die 10. In an adjoining manner, the arbor 20 has an extension 22 which extends through the outlet opening of the bottom die 10 and into the passage openings 18 of the further bottom die elements 11, 12, 13, 14 and which consists of a plurality of segments 16 which are connected with one another in a movable manner. The segments 26 particularly have a cross-section which is adapted to the inside cross-section of the hollow profile 4'. The movable connection of the segments 26 takes place, for example, by means of short spacer pins. However, other types of connections are also possible, such as a hose segment connection or the like.

According to preferred embodiments of the invention, the stationary crosshead 30 of the extrusion arrangement 1 is arranged at a distance from the extrusion chamber 2 by means of the holding device 8, in which case an additional supporting element 32 of the stationary crosshead 30 may be provided on the extrusion chamber 2. The holding device 8 has a lateral, downward-pointing opening 9 through which the curved billet 4' can be pulled off in front of the stationary crosshead 30. Straight extruded profiles are pulled off through a profile outlet opening 34 of the stationary crosshead 30 arranged essentially concentrically with respect to the openings 16, 18 of the bottom die 10 or the further bottom die elements 11, 12, 13, 14.

Thus, according to the invention, for manufacturing spatially bent extruded profiles of a three-dimensional structure, a bottom die configuration is provided which is constructed in a segmented form and in the case of which the bottom die elements formed by shaped disks can be changed individually in their position and orientation. As a result, a shape of the extruded profile is defined which is endeavored in the extrusion process. In order to avoid a buckling of the profile wall in the case of hollow profiles, an arbor is used according to the invention which has a segmented extension which reaches into the passage openings of the further bottom die elements and which, because of the exterior force effect by the extruded profile, is adapted to the form dimensions of the extrusion duct. According to the invention, profile shapes can therefore be extruded in a bending and twisting manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Extrusion arrangement for manufacturing bent workpieces, having an extrusion die which is guided in an extrusion chamber and which compresses material situated in the extrusion chamber and presses it through a first bottom die arranged at a head-side end of the extrusion chamber, further bottom die elements being provided which are arranged in a parallel adjoining manner behind the first bottom die, wherein the further bottom die elements are displaceably and rotatably disposed such that their successive passage openings form an extrusion duct of a variable curvature and twist.

2. Extrusion arrangement according to claim 1, wherein passage openings of the further bottom die elements have rounded edges.

3. Extrusion arrangement according to claim 1, wherein a holding device is provided for the bottom die elements.

4. Extrusion arrangement according to claim 2, wherein a holding device is provided for the bottom die elements.

5. Extrusion arrangement according to claim 3, wherein the holding device is exchangeable.

6. Extrusion arrangement according to claim 4, wherein the holding device is exchangeable.

7. Extrusion arrangement according to claim 3, wherein the first bottom die is part of the holding device.

8. Extrusion arrangement according to claim 6, wherein the first bottom die is part of the holding device.

9. Extrusion arrangement according to claim 1, comprising a stationary crosshead arranged in a spaced manner with respect to the first bottom die and the further bottom die elements.

10. Extrusion arrangement according to claim 9, wherein a holding device is provided for the bottom die elements.

11. Extrusion arrangement according to claim 10, wherein the holding device is exchangeable.

12. Extrusion arrangement according to claim 10, wherein the holding device acts upon the stationary crosshead, and wherein a lateral opening for pulling off a curved billet in front of the stationary crosshead is provided in the holding device.

13. Extrusion arrangement according to claim 11, wherein the holding device acts upon the stationary crosshead, and wherein a lateral opening for pulling off a curved billet in front of the stationary crosshead is provided in the holding device.

14. Extrusion arrangement according to claim 1, wherein an arbor is provided in the interior of the extrusion chamber which is arranged essentially concentrically with respect to the outlet opening of the first bottom die.

15. Extrusion arrangement according to claim 14, wherein the arbor has an extension which extends through the outlet opening of the first bottom die and into the passage openings of the further bottom die elements.

16. Extrusion arrangement according to claim 15, wherein the extension consists of a plurality of segments which are movably connected with one another.

17. Extrusion arrangement according to claim 4, wherein an arbor is provided in the interior of the extrusion chamber which is arranged essentially concentrically with respect to the outlet opening of the first bottom die.

18. Extrusion arrangement according to claim 8, wherein an arbor is provided in the interior of the extrusion chamber which is arranged essentially concentrically with respect to the outlet opening of the first bottom die.

19. Extrusion arrangement according to claim 11, wherein an arbor is provided in the interior of the extrusion chamber which is arranged essentially concentrically with respect to the outlet opening of the bottom die.

20. Extrusion arrangement according to claim 19, wherein the arbor has an extension which extends through the outlet opening of the first bottom die and into the passage openings of the further bottom die elements.

21. Extrusion arrangement according to claim 20, wherein the extension consists of a plurality of segments which are movably connected with one another.

22. Method of making a bent workpiece comprising:

pressing material in an extrusion chamber through a first bottom die and a plurality of separately adjustable bottom die elements arranged in a parallel adjoining manner behind the first bottom die, wherein the further bottom die elements are displaceably and rotatably disposed such that their successive passage openings form an extrusion duct of a variable curvature and twist.

23. A method according to claim 22, wherein passage openings of the further bottom die elements have rounded edges.

24. A method according to claim 23, wherein a holding device is provided for the bottom die elements.

25. A method according to claim 24, wherein the holding device is exchangeable.

26. A method according to claim 25, wherein the first bottom die is part of the holding device.

27. A method according to claim 26, comprising a stationary crosshead arranged in a spaced manner with respect to the first bottom die and the further bottom die elements.

28. A method according to claim 27, wherein the holding device acts upon the stationary crosshead, and wherein a lateral opening for pulling off a curved billet in front of the stationary crosshead is provided in the holding device.

29. A method according to claim 28, wherein an arbor is provided in the interior of the extrusion chamber which is arranged essentially concentrically with respect to the outlet opening of the first bottom die.

30. A method according to claim 29, wherein the arbor has an extension which extends through the outlet opening of the first bottom die and into the passage openings of the further bottom die elements.

* * * * *